Oct. 2, 1923.
E. D. BLACKINTON ET AL
1,469,713
PORTABLE CAB
Filed April 5, 1923
2 Sheets-Sheet 1
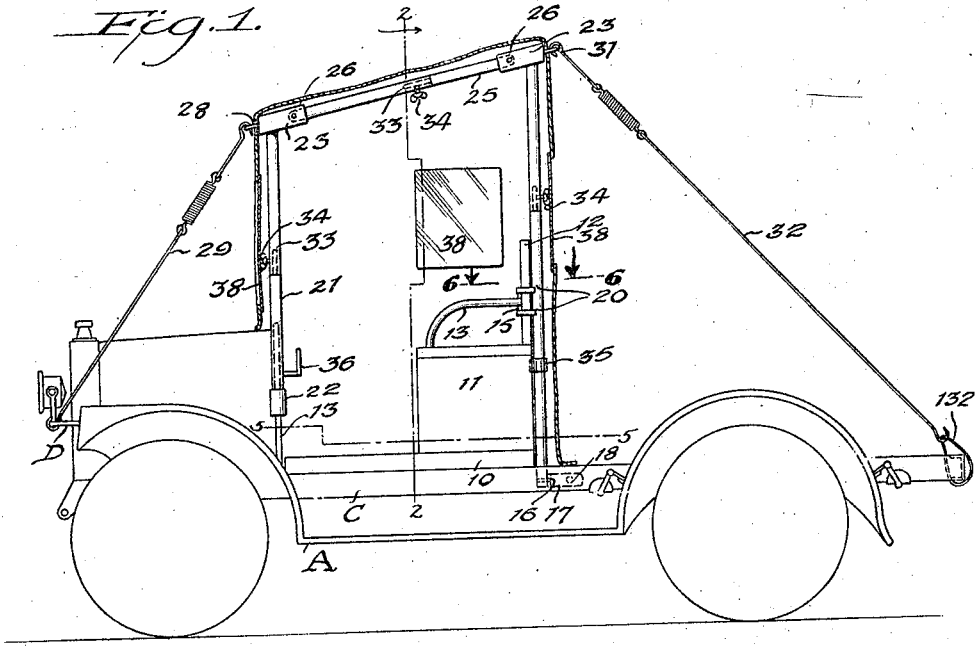
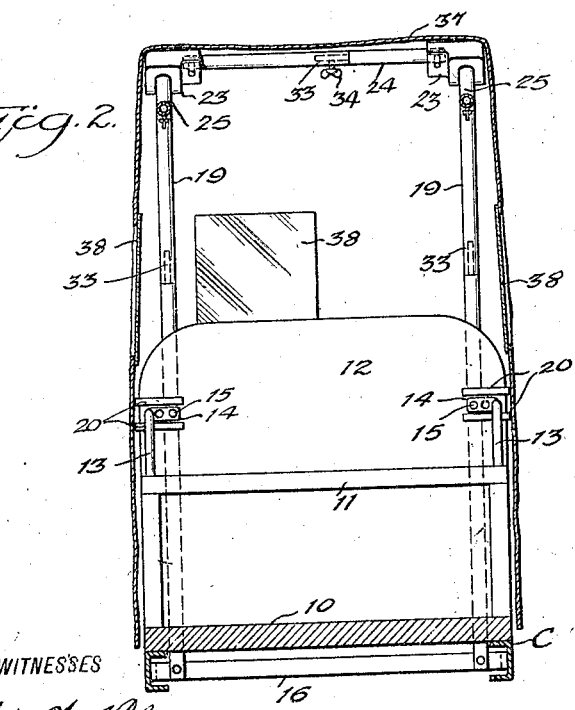
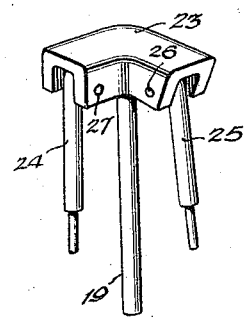
INVENTOR
E. D. BLACKINTON
G. E. SMITH
ATTORNEYS Oct. 2, 1923.   
E. D. BLACKINTON ET AL   
1,469,713
PORTABLE CAB
Filed April 5, 1923   2 Sheets-Sheet 2
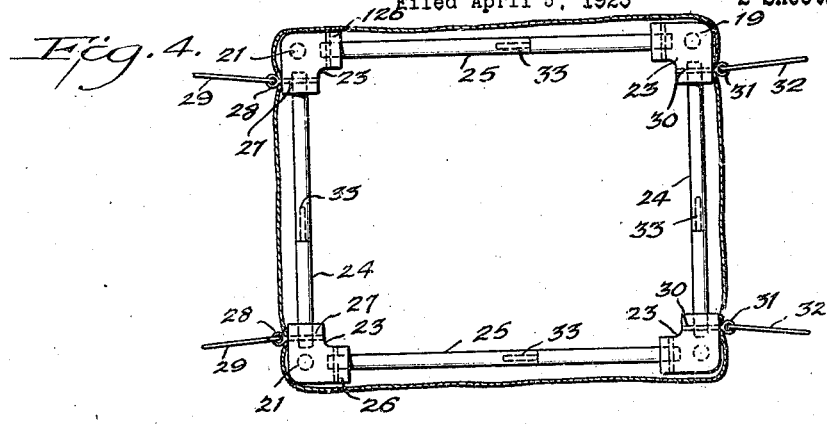
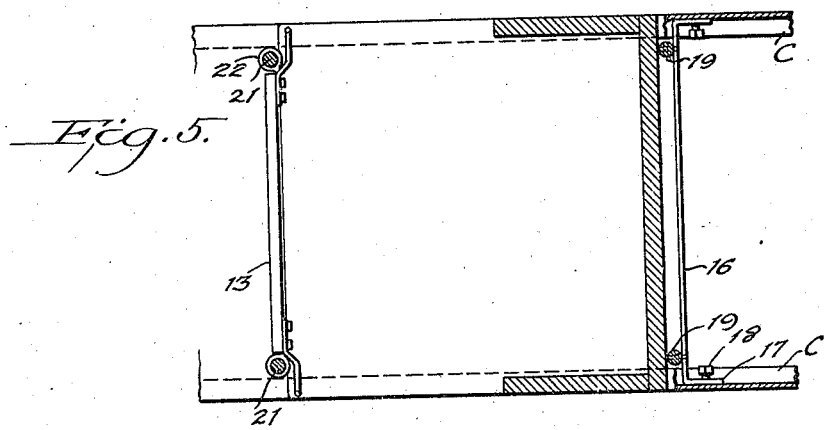
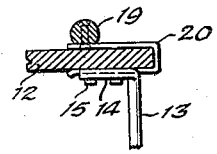
WITNESSES
INVENTOR
E.D. BLACKINTON
G. E. SMITH
BY
ATTORNEYS Patented Oct. 2, 1923.

1,469,713

UNITED STATES PATENT OFFICE.

ERNEST D. BLACKINTON, OF GROTON, AND GEORGE E. SMITH, OF WATERFORD, CONNECTICUT.

PORTABLE CAB.

Application filed April 5, 1923. Serial No. 630,142.

*To all whom it may concern:*

Be it known that we, ERNEST D. BLACKINTON and GEORGE E. SMITH, citizens of the United States of America, and residents, respectively, of Groton, in the county of New London and State of Connecticut, and Waterford, in the county of New London and State of Connecticut, have invented a new and Improved Portable Cab, of which the following is a description.

Our invention relates to a portable cab for use on trucks, tractors or motor vehicles and is particularly adapted for use on a chassis to be driven over a road.

The general object of our invention is to provide a portable cab attachment of the indicated character adapted to be conveniently emplaced or to be knocked down in small compass for easy transportation, storage, etc.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of an automobile conventionally shown with our improved portable cab attachment emplaced thereon, the cover of the cab attachment being in vertical section;

Figure 2 is a transverse vertical section in a plane indicated by the line 2—2, Figure 1;

Figure 3 is a perspective view of a fragment of the attachment at a corner of the same;

Figure 4 is a plan view with the cover in horizontal section;

Figure 5 is a horizontal section on the line 5—5, Figure 1;

Figure 6 is a detail in horizontal section on the line 6—6, Figure 1;

Figure 7 is a rear elevation of a fragment of the dashboard and a prop received in a socket attachable to said dashboard or equivalent support.

In the illustrated example of our invention A indicates a chassis shown conventionally; B, the dashboard thereof; and C, side frame bars.

We have shown our invention applied to a chassis and our attachment is shown as including a baseboard or footboard 10 provided with a seat 11, the numeral 12 indicating the seat back, and 13 arm rests on the seat, said arm rests having laterally bent flattened ends as at 14 secured by bolts or rivets 15.

The numeral 16 indicates a cross bar which is shown as one means for affording support for the portable cab structure from the side bars C of the chassis frame. Said cross bar 16 has turned ends 17 secured by screws 18 or the like in practice to the bars C. Riveted to and rising from the cross bar 16 near the ends are standards 19, each of which has a U-shaped clip 20 rigid therewith and adapted to engage the seat back 12 at the side edges as best seen in Figures 1, 2 and 6. The structure includes also front props or standards 21 which may have any suitable support on any fixed part of the chassis or on the baseboard. In the illustrated example we have shown sockets 22 on the dashboard B to receive the lower ends of the standards 21.

The standards 19 and 21 connect at their upper ends with fixed corner pieces 23; said pieces 23 may be formed of stamped or cast metal while the standards 19 and 21 are formed of piping or tubing. Connected also with the corner pieces 23 are front and rear cross bars 24 and side bars 25. The side bars 25 are secured at their ends by a pivot or hinge connection to the corner pieces 23. In the illustrated form pivot pins 26 secure the side bars. The front cross bar 24 is shown secured at its ends by pins 27 having eyes 28 to which guy wires 29 are secured, said wires at their lower ends connecting with the lamp brackets D or other fixed part of the vehicle. Similarly, the rear cross bars 24 have their ends secured to the corner pieces 23 by pins 30 having eyes 31 to which are connected guy wires 32, the rear lower ends of which are made fast by a loop, strap, or wire 132 to the rear ends of the frame bars C.

The front and rear cross bars 24 with side bars 25 are made in sections detachably connected in any suitable manner by a tenon and socket connection as indicated at 33, the sockets being provided with thumb screws 34 or the like. With the thumb screws loosened and the sections of the standards 19 and 21 and the bars 24 and 25 separated, the elements may be assembled in compact knock-down form, the sections of the bars 24, 25 closing at their pivots 26, 27 to positions alongside the upper sections of the standards 19 and 21. In disassembling the structure the screws 18 are unscrewed; the clips 20 disengaged from the seat back 12; the guy wires 29, 32 are detached at their lower ends and the front standards 21 are removed from the front sockets 22.

The lower portion of each standard 19 or portion below the tenon and socket connection at 33 may be formed in coupled sections, a coupler being indicated at 35. The numeral 36 indicates a lamp bracket on the dashboard B.

The frame provided by the standards 19 and 21, the corner pieces 23, and bars 24, 25, is adapted to support a waterproof cover 37, which, in practice, may be made of any suitable material. The cover extends at the front and back and at the sides of the frame and has openings therein closed by flaps 38. The fabric is positively fastened to the frame in any suitable manner; in the illustrated form the pivot pins 27 pass through the waterproof cover to the corner pieces 23.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A portable cab comprising a baseboard, a seat thereon, a cab frame, means to support said frame, said means including a cross bar at the bottom of said frame having means to secure it to frame bars of a chassis, means to fasten said frame to said seat, and a cover adapted to be supported by said frame.

2. A portable cab including a frame, means to support said frame at its lower end on a vehicle, and a cover for the frame, said frame including standards, and top bars connecting the frame, said standards and said top bars having separable joints; together with means supported by said standards and to which the top bar sections are pivoted at their ends.

3. In a portable cab, a cover-supporting frame comprising standards, means to support said standards at their lower ends on a vehicle, corner pieces rigid with the standards at their upper ends, and top bars composed of jointed sections, said sections pivoted to said corner pieces.

4. In a portable cab, a cover-supporting frame comprising front and rear standards, cross bars rigid with the standards near their lower ends, means to secure said cross bar to the chassis frame, means to support said front standards at their lower ends, corner pieces supported on the upper ends of the standards, front and rear bars and side bars composed of sections, the bar sections being connected with said corner pieces to swing in vertical planes to folded positions adjacent the standards or to positions with the sections of the respective bars connected with each other.

5. In a portable cab, a cover-supporting frame comprising front and rear standards, cross bars rigid with the standards near their lower ends, means to secure said cross bar to the chassis frame, means to support said front standards at their lower ends, corner pieces supported on the upper ends of the standards, front and rear bars and side bars composed of sections, the bar sections being connected with said corner pieces to swing in vertical planes to folded positions adjacent the standards or to positions with the sections of the respective bars connected with each other; together with a seat, and means to secure certain of the standards to said seat.

ERNEST D. BLACKINTON.
GEORGE E. SMITH.